United States Patent Office 3,672,921
Patented June 27, 1972

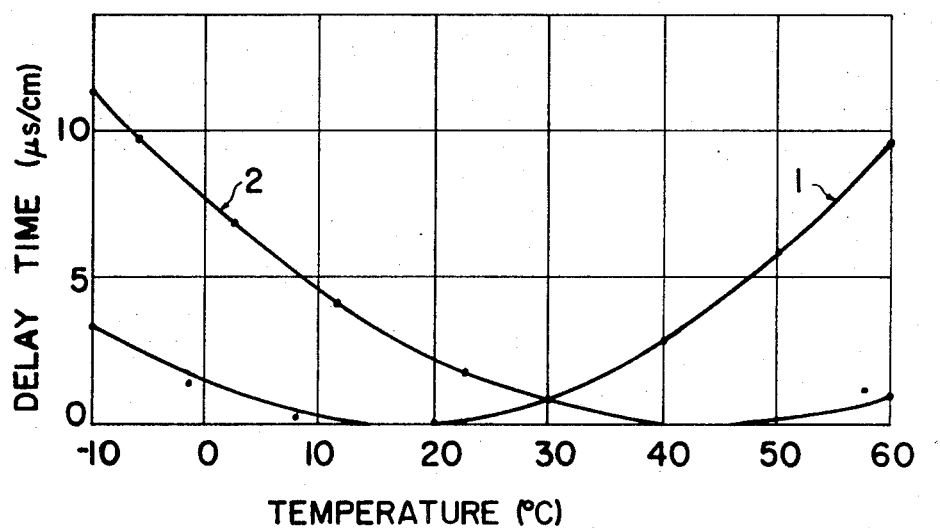

3,672,921
GLASS FOR ULTRASONIC DELAY LINE
Yoshiyuki Asahara, Kawasaki, and Tetsuro Izumitani, Tokyo, Japan, assignors to Hoya Glass Works, Limited, Tokyo, Japan
Filed May 19, 1970, Ser. No. 38,797
Claims priority, application Japan, May 24, 1969, 44/40,454
Int. Cl. C03c 3/04, 3/10; H03h 7/30
U.S. Cl. 106—53
2 Claims

ABSTRACT OF THE DISCLOSURE

An ultrasonic delay line glass having improved temperature-coefficient and time dependencies of delay time and stability during melting can be obtained by incorporating $B_2O_3$ into a glass composition of the $SiO_2$-$K_2O$-$PbO$ system and reducing a content of $K_2O$.

The present invention relates to an ultrasonic delay line glass having low temperature-coefficient and time dependencies of its delay time at around room temperature and being stable in melting operation.

Ultrasonic delay line glasses having a low temperature-coefficient dependency of their delay time at around room temperature have been produced heretofore by diluting a $SiO_2$ component having a negative temperature-coefficient of delay time with other modifying oxides having a positive temperature-coefficient thereof. Among the oxides having a positive temperature-coefficient of delay time, $K_2O$ has the low attenuation for ultrasonic wave and a relatively low effect on increasing positively the temperature-coefficient of delay time comparing with other alkali oxides. PbO also has a very low effect on increasing positively the temperature-coefficient of delay time. Therefore, a large amount of these oxides can be incorporated in the glasses. Thus, the $SiO_2$-$K_2O$-$PbO$ glass has been desirable. In order to make lower the temperature-coefficient of delay time with the ternary glass composition, it has been well known that in a glass composition containing a relatively large amount of $K_2O$, the proportions of $K_2O$ and PBO are expressed by a constant ratio as $$PbO = 62 \pm 2 - \frac{15}{7} K_2O$$

and the balance is $SiO_2$.

With the high $K_2O$ glass, there can be produced a stable glass similar to a general optical glass composition. However, since a large number of potassium ions existing in the glass are capable of easily migrating, the temperature-coefficient of delay time of the glass is subject to the thermal history thereof and varies largely with time, so that it is difficult to obtain a glass having a constant temperature dependency. Alternatively, with a glass composition containing a small amount of $K_2O$ and therefore a large amount of PbO, there is produced a glass having a small variation of delay time with time and being not subject to its thermal history. However, such a glass has much lower contents of $K_2O$ and PbO and a higher content of $SiO_2$ than those of general optical glasses. Further, it has been experimentally found that in the case of the composition having a low content of $K_2O$, the proportions of $K_2O$ and PbO required for lowering the temperature-coefficient of delay time cannot be expressed by the above linear equation and shifts to such a composition as having essentially much lower contents of $K_2O$ and/or PbO and being rich in $SiO_2$. The glass produced from such a composition has a high viscosity and less stability, so that it is difficult to be produced on commercial scale.

Therefore, an object of the present invention is to provide a method for improving an ultrasonic delay line glass of the $SiO_2$-$K_2O$-$PbO$ system as to its temperature-coefficient and time dependencies of delay time and stability during melting.

Another object of the present invention is to provide an ultrasonic delay line glass of the $SiO_2$-$B_2O_3$-$K_2O$-$PbO$ system having a lower temperature-coefficient of the delay time, a smaller variation of said coefficient with time at around room temperature and further a lower viscosity to be stable in melting operation.

Although a $B_2O_3$ component is generally considered as glass forming oxide similar to $SiO_2$, it has been found that while $SiO_2$ has a negative temperature-coefficient of delay time, $B_2O_3$ has adversely a positive coefficient and can be introduced in the glass in the same manner as other modifying oxides in a large amount because of its low effect on increasing positively said coefficient. Further, the glass made unstable due to the reduction of $K_2O$ for lowering the variation of said coefficient with time has been found to be extremely stabilized by the introduction of $B_2O_3$.

The glass of the present invention is produced from a composition consisting by weight of 5.0–8.0% $K_2O$, 28.0–45.0% PbO, 40.0–53.5% $SiO_2$ and 5.0–10.0% $B_2O_3$. The $B_2O_3$ component enhances the tendency to devitrification if it is less than 5.0% and lowers the chemical durability if more than 10.0%. The content of $K_2O$ less than 5.0% increases the viscosity and the tendency to devitrification of the glass, and that more than 8.0% increases the variation of said coefficient with time. Further, the ranges of 28.0–38.0% PbO and 49.5–53.5% $SiO_2$ have been inevitably determined for minimizing the temperature-coefficient delay time. The glass of the present invention is characterized by the fact that the variation of said coefficient with time is minimized by reducing the $K_2O$ component responsible for the large variation and the unstability of the glass during melting due to the reduction of $K_2O$ being avoided by incorporating $B_2O_3$ having a completely opposite effect on said coefficient to $SiO_2$ as a glass forming oxide, so as to produce the $SiO_2$-$B_2O_3$-$K_2O$-$PbO$ system. Thus, the glass has advantageously such a low temperature-coefficient of delay time as $2 \times 10^{-6}$° C. or less in the temperature range of $-10$°$\sim$60° C. and is as stable as being almost not devitrified even by maintaining it for about 30 minutes in the devitrification range (for example, in the temperature range of about 400$\sim$1000° C.).

Further, in order to enhance the chemical durability and stability, a small amount of $Al_2O_3$ (0–1.5%) may be added without affecting the coefficient of the delay time to temperature. An increasing of viscosity owing to the adition of $Al_2O_3$ has been found not having any inconvenient effects on the production of glass because the original glass system has a very low viscosity. As refining agents, also 0–0.5% of $As_2O_3$ and $Sb_2O_3$ may be added without any influence on the coefficient.

The following examples illustrate the present invention with reference to the accompanying drawing which shows the relationships of the delay time and temperature determined with glasses in Examples 1 and 2.

Examples 1–8

Glass batches indicated in the following table were melted at a temperature of about 1380° C. and then stirred at a temperature of 1300$\sim$1100° C. Thereafter, they were annealed in the same manner as general optical glasses. After cooling, they were determined with respect to their ultrasonic delay time, temperature-coefficient of delay time and chemical durability. The determination of the chemical durability was carried out by grinding a sample of an amount corresponding to its specific gravity to a particle size of 28–35 mesh, boiling the powder in 150 ml. of $HNO_3$ ($1/100$ N) and measuring its weight loss (%). The results are summarized in the table in which compositions are based on percent by weight.

| No. | 1 | 2 | 3 | 4 | 5 | 6 | 7 | 8 |
|---|---|---|---|---|---|---|---|---|
| $SiO_2$ | 49.5 | 53.5 | 51.5 | 51.5 | 47.8 | 46.3 | 43.0 | 46.8 |
| PbO | 37.5 | 29.0 | 33.0 | 33.0 | 38.1 | 39.2 | 43.6 | 38.8 |
| $K_2O$ | 7.0 | 7.0 | 7.0 | 7.0 | 7.0 | 7.2 | 5.0 | 7.1 |
| $B_2O_3$ | 5.5 | 10.0 | 8.0 | 6.5 | 5.6 | 5.8 | 6.8 | 5.7 |
| $As_2O_3$ | 0.3 | 0.3 | 0.3 | 0.3 | 0.3 | 0.3 | 0.3 | 0.3 |
| $Sb_2O_3$ | 0.2 | 0.2 | 0.2 | 0.2 | 0.2 | 0.2 | 0.2 | 0.2 |
| $Al_2O_3$ | | | | 1.5 | 1.0 | 1.0 | 1.1 | 1.0 |
| Temperature-coefficient of delay time (p.p.m./°C.) | 1.36 | 1.62 | 1.17 | 1.45 | 2.00 | 1.86 | 1.80 | 1.20 |
| Delay time per unit length (μS/cm.) | 3.57 | 3.39 | 3.50 | 3.50 | 3.57 | 3.64 | 3.75 | 3.60 |
| Chemical durability (percent) | 0.14 | {0.30, 0.32} | 0.17 | 0.16 | 0.40 | 0.403 | 0.45 | 0.42 |

The glass according to the present invention can be continuously melted owing to its stability and low viscosity during melting and used over a long duration owing to its chemical durability.

What is claimed is:

1. A method of improving an ultrasonic delay line glass of the $SiO_2$-$K_2O$-PbO system so that the aging effect of the delay time is a minimum and the temperature coefficient at about room temperature is also a minimum and wherein the glass has a high stability during melting, characterized by replacing a part of the $K_2O$ content by $B_2O_3$ whereby the resulting glass composition consists of, by weight, 40.0 to 53.5% $SiO_2$, 5.0 to 8.0% $K_2O$, 28.0 to 45.0% PbO, 0 to 0.5 of a refining agent selected from $As_2O_3$, $Sb_2O_3$ and mixtures thereof, 0 to 1.5% $Al_2O_3$ and 5.0 to 10.0% $B_2O_3$, the composition totalling 100 weight percent, and having a temperature-coefficient of delay time of up to $2 \times 10^{-6}$/°C. in the temperature range of about $-10°$ C. to about $60°$ C.

2. A glass for use in ultarsonic delay line including components in a balance of $SiO_2$-PbO-$K_2O$ and $B_2O_3$ so that the temperature-coefficient at about room temperature as well as the ageing effect of the delay time are a minimum while the stability of the glass during melting is high, said glass composition consisting of, by weight, 40.0 to 53.5% $SiO_2$, 28.0 to 45.0% PbO, 0 to 0.5 of a refining agent selected from $As_2O_3$, $Sb_2O_3$ and mixtures thereof, 0 to 1.5% $Al_2O_3$, 5.0 to 8.0% $K_2O$ and 5.0 to 10.0% $B_2O_3$, said composition totalling 100 weight percent, and having a temperature-coefficient of delay time of up to $2 \times 10^{-6}$/°C. in the temperature range of about $-10°$ C. to about $60°$ C.

References Cited

UNITED STATES PATENTS

| 2,882,187 | 4/1959 | Kwate | 106—49 |
| 3,138,561 | 6/1964 | Labino | 106—53 |
| 3,154,425 | 10/1964 | Hoover et al. | 106—53 |
| 3,173,780 | 3/1965 | Hoover | 106—53 |

FOREIGN PATENTS

| 1,118,422 | 7/1968 | Great Britain | 106—53 |

TOBIAS E. LEVOW, Primary Examiner

M. L. BELL, Assistant Examiner

U.S. Cl. X.R.

333—30 R